United States Patent [19]

Lentz et al.

[11] Patent Number: 5,261,106

[45] Date of Patent: Nov. 9, 1993

[54] SEMAPHORE BYPASS

[75] Inventors: Derek J. Lentz, Los Gatos; Te-Li Lau, Palto Alto, both of Calif.

[73] Assignee: S-MOS Systems, Inc., San Jose, Calif.

[21] Appl. No.: 805,838

[22] Filed: Dec. 13, 1991

[51] Int. Cl.$^5$ ............................................. G06F 15/16
[52] U.S. Cl. ..................................... 395/725; 395/325; 395/425; 395/200
[58] Field of Search ................ 364/200; 395/725, 425, 395/650, 325, 200

[56] References Cited

U.S. PATENT DOCUMENTS

| | | | |
|---|---|---|---|
| 4,320,451 | 3/1982 | Bachman et al. | 395/325 |
| 4,594,657 | 6/1986 | Byrns | 395/725 |
| 4,635,189 | 1/1987 | Kendall | 364/200 |
| 4,642,760 | 2/1987 | Yanai et al. | 364/200 |
| 4,745,541 | 5/1988 | Vaniglia | 364/141 |
| 4,780,822 | 10/1988 | Miller | 395/425 |
| 4,785,394 | 11/1988 | Fischer | 395/325 |
| 4,928,222 | 5/1990 | Vriezen et al. | 395/650 |
| 4,965,718 | 10/1990 | George et al. | 364/200 |
| 4,975,833 | 12/1990 | Jinzaki | 364/200 |
| 5,006,978 | 4/1991 | Neches | 364/200 |
| 5,050,072 | 9/1991 | Earnshaw et al. | 395/325 |
| 5,081,702 | 1/1992 | Hamdan | 395/725 |
| 5,109,486 | 4/1992 | Seymour | 395/200 |

FOREIGN PATENT DOCUMENTS 0351556  1/1990  European Pat. Off. .

OTHER PUBLICATIONS

Fielland et al., "32-Bit Computer Shares Load Equally Among Up to 12 Processors", *Electronic Design*, vol. 32, No. 18, Sep. 1984, pp. 153-168.
Patent Abstracts of Japan vol. 9, No. 314, Publication No. JP60144855, Jul. 31, 1985.
Reinder Bril, "On Cacheability of Lock-Variables in Tightly Coupled Multiprocessor Systems", *Computer Architecture News*, vol. 15, No. 3, Jul. 1987, pp. 25-32.
Thomas Anderson, "The Performance Implications of Spin-Waiting Alternatives for Shared-Memory Multiprocessors", Proc. Intl. Conf. on Parallel Processing, Aug. 1989, pp. II-170–II-174.

*Primary Examiner*—Michael R. Fleming
*Assistant Examiner*—Tariq R. Hafiz
*Attorney, Agent, or Firm*—Sterne, Kessler, Goldstein & Fox

[57] ABSTRACT

The present invention provides a test and set bypass mechanism which allows access to a semaphore while eliminating memory bandwidth degradation due to the traditional "spin-locking" problem. Generally, a storage and comparison structure in a processor, such as a content addressable memory (CAM), is used to store the address of the semaphore whenever it is requested. Thus, the process/processor, or other processors in a multiprocessor system, then need only check to see if the semaphore address is present in its respective storage and comparison structure. Consequently, there is no need to make multiple memory transactions for failed access of the semaphore, and hence, effective memory bandwidth is increased.

30 Claims, 3 Drawing Sheets

SEMAPHORE BYPASS

BACKGROUND OF THE INVENTION

1. Field of the Invention

The present invention relates generally to a system and method of utilizing semaphores to synchronize multiple processes, and more particularly to a system and method for providing a semaphore bypass mechanism which reduces the amount of memory bandwidth waste.

2. Discussion of Related Art

One of the major requirements of a shared-memory multiprocessor is being able to coordinate processes that are working on a common task. Typically, a programmer will use semaphores to synchronize the processes. As such, semaphores are widely used to prevent asynchronous accesses to resources such as devices or memory locations. A common semaphore implementation is by means of a test and set mechanism. In such a mechanism, a semaphore is a flag or label which is stored in an addressable memory location for controlling access to certain regions of memory or other addressable resources.

When a process wishes to access a region of memory, for example memory region xyz, with which a semaphore is associated, and wants to prevent other processes from accessing that region, the process writes all 1's into the semaphore associated with that particular memory region. If a different process should wish to access memory region xyz, it first checks the semaphore and if it finds that there are all 1's in the semaphore, the process knows that it is denied access.

Heretofore, the second process continually goes to memory and checks the semaphore to see if memory region xyz is available. This constant checking of the semaphore is called "spin-locking" and it wastes an enormous amount of memory bandwidth since the semaphore may not be available for a long time and each semaphore access means a memory transaction. For a more in-depth discussion on the above discussed synchronization mechanism, see Hennessy, et al., *Computer Architecture a Quantitative Approach*, Chapter 8, Morgan Kaufman Publishers (1990) which is hereby incorporated by reference herein in its entirety.

U.S. Pat. No. 5,050,072 to Earnshaw et al. (hereinafter the Earnshaw patent) describes a system for reducing common bus contention. It allows the semaphore test bit and set operations to be performed on each CPU's local bus. An identical copy of the semaphore lock bits are stored locally in SRAM on each CPU. SRAM's have a limited amount of storage space, and eventually the SRAM memory is filled with semaphores and the mechanism described in the Earnshaw patent will once again fall victim to spin locking. In addition, the Earnshaw patent caches semaphores. Caching of semaphores is expensive and difficult, and decreases system performance. Specifically, the SRAM used in the Earnshaw patent stores the identical semaphore lock bits of every other CPU's SRAM, which wastes a great amount of space.

SUMMARY OF THE INVENTION

In view of the foregoing, the present invention provides a test and set bypass mechanism and method which allows access to a semaphore while reducing memory bandwidth utilization due to the traditional "spin-locking" problem" (i.e., providing greater effective memory bandwidth). Generally, a storage and comparison structure in a CPU, such as a content addressable memory (CAM), is used to store the address of the semaphore whenever it is requested. Since the semaphore address is stored in the storage compare device 120, there is no need to cache the semaphore. Rather, only the most recently failed semaphore addresses are stored in the storage and comparison structure. Thus, processes of the CPU, or other CPU's in a multiprocessor system, then need only to check to see if the semaphore address is present in its respective storage and comparison structure. Consequently, there is no need to make a memory transaction to access the semaphore, and hence, effective memory bandwidth is substantially increased.

The entry in the storage and comparison structure is cleared when any process/processor performs a write to a small region of memory enclosing the semaphore. The CPU checks (snoops) the shared memory bus to see if any CPU (including itself) is writing to the relevant semaphore. If any CPU writes to a semaphore that matches an entry in the storage and comparison device, that entry in the storage and comparison device is cleared.

When the owner of the locked resource (i.e., memory region or peripheral device), for example, clears the semaphore in memory, the semaphore address in the storage and comparison structure is also cleared. Then the resource is available to other processors/processes.

BRIEF DESCRIPTION OF THE DRAWINGS

The foregoing and other features and advantages of the invention will be apparent from the following more particular description of the preferred embodiments of the invention, as illustrated in the accompanying drawings, in which.

DETAILED DESCRIPTION OF THE PREFERRED EMBODIMENTS

Figure 1:
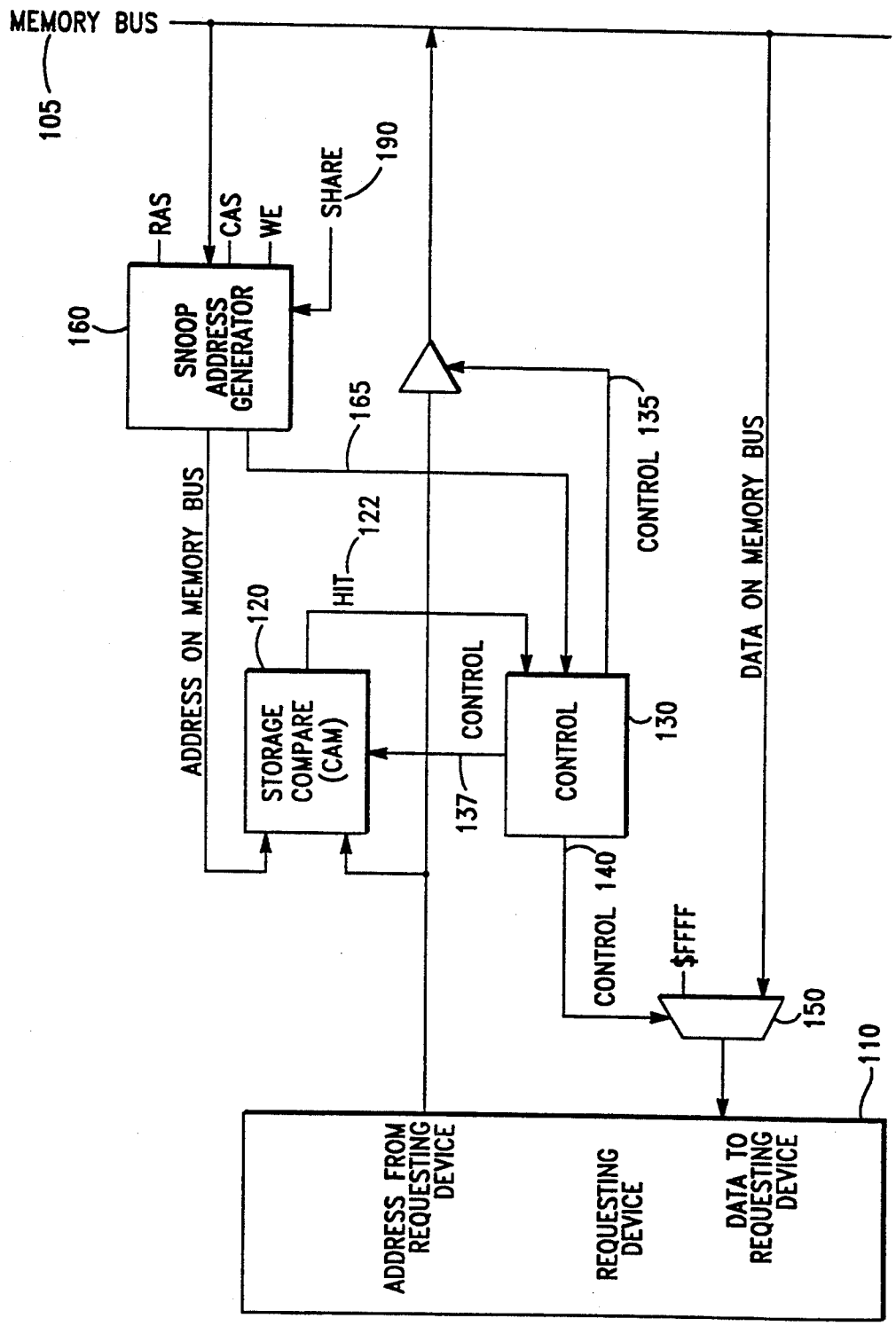
FIG. 1 shows a general block diagram of a possible implementation of the datapath which incorporates the preferred embodiment of the present invention.

Referring to FIG. 1, a test and set bypass circuit 100 of the present invention includes a basic memory requesting device 110 (such as a cache), a storage compare device 120, and a control block 130. A bus 105 interconnects the test and set bypass circuit 100 to a memory device. The bus 105 may also be connected to other such test and set bypass datapath mechanisms, for example, on a different CPU chip.

The storage compare device 120 is typically a content addressable memory (CAM). A valid bit is associated with each storage location in storage compare device 120. This safeguards against the possibility that a semaphore address that might randomly appear in storage compare device 120 (e.g., during a power up), will not be mistaken for a semaphore address which has been locked. Thus, when the valid bit is set, the semaphore address associated with that valid bit has been locked. The number of entries in the storage compare 120 is determined by the specific architectural constraints of the system utilizing the present invention.

Figure 2:
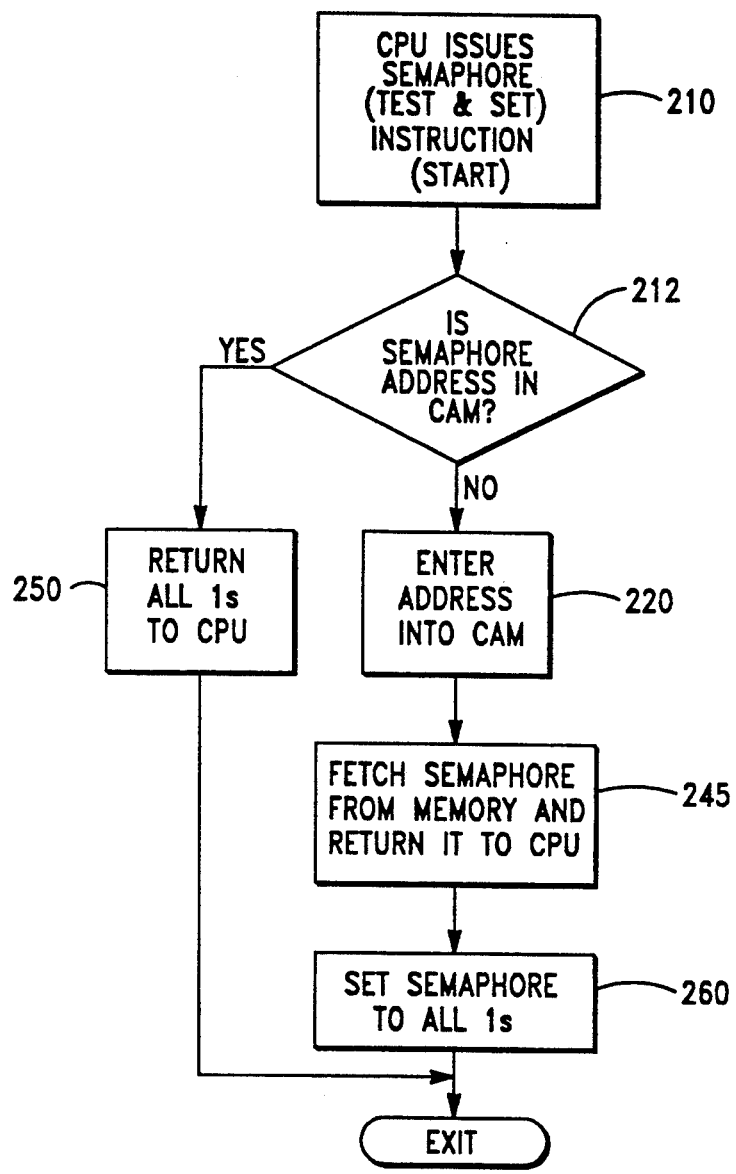
FIG. 2 shows a flowchart of a method of the present invention of accessing a memory location which is protected by a semaphore.

As will be seen, the test and set bypass circuit 100 reduces the amount of memory bandwidth consumed by spin-locking for a semaphore. Referring to FIG. 2, a method of the present invention of accessing a memory location protected by a semaphore mechanism is now described. As shown in a block 210, a CPU (requesting device), or more precisely, a process in the processor, first requests access to a resource, with which a semaphore is associated, by issuing a test-and-set instruction (i.e., a predetermined instruction associated with a request to access a semaphore). Initially, the storage compare device 120 is checked to determine whether the semaphore is already locked, as shown in block 212. If it is not present in the storage compare device 120, block 220 stores the address of the semaphore in the storage compare device 120. Block 245 then performs a memory transaction to check the semaphore and determine whether it has been previously locked by another process/processor.

As shown in blocks 245 and 260, when the requesting device 110 is allowed to access a memory location (i.e., the semaphore associated with the memory location is not indicated, by storage compare device 120, to be locked), the requesting device will lock the semaphore and store the address of the semaphore in the storage compare device 120. Plural test-and-set instructions can result in plural entries being stored in the storage compare device 120. If, after checking the semaphore, the semaphore is locked (i.e., the semaphore contains all 1's ($FFFF's)), then all 1's are returned to the requesting device indicating that access has been denied. Moreover, the address of the semaphore is stored in storage compare device 120.

When another process/processor requests access to a semaphore, that process/processor checks its associated storage compare device 120, as shown in block 212. If the address of the requested semaphore is resident in storage compare device 120, the process/processor knows that the semaphore has not been released by the process/processor which locked it. The requesting device 110 receives all 1's (which means semaphore failed), as shown in block 250, and the semaphore is not requested from memory. Thus, memory bandwidth is not unnecessarily wasted. Subsequently, requesting device 110 may periodically repeat the test and set instruction, which checks the storage compare device 120, to determine whether the semaphore has been unlocked.

On the other hand, if the semaphore address is not in the storage compare unit 120, this means that the semaphore has not been previously requested or that it has been released or it has been replaced with another semaphore address. Consequently, a memory transaction occurs, and an access to the semaphore location is attempted by the requesting device 110.

Next, the system and method of the present invention for storing the semaphore address in the storage compare device 120 are described below. Reference is again made to FIG. 1. Initially, the storage compare device 120 is empty. When the requesting device 110 makes a request for a semaphore (i.e., a request for a portion of memory), the control block 130 looks up the storage compare device 120 to see if the semaphore address has already been stored. If the semaphore address is stored in this device, a HIT signal 122 is generated. This HIT signal 122 is received by the control block 130, which prevents the memory request from being sent out on the memory bus 105 by means of a control line 135.

Control block 130 also sends out a control signal 140. Control signal 140 is connected to a multiplexer 150. Multiplexer 150 selects, in accordance with the control line 140, either data from the memory bus 105 or data containing all 1's. If the HIT signal 122 is generated by the control block 130, the data containing all 1's is sent back to the requesting device. The data containing all 1's indicates that another process/processor currently has access to the particular memory location requested by the requesting device 110, and thus, the respective semaphore has been locked.

If no HIT signal 122 is generated by the storage compare device 120, the control block 130 knows that this semaphore has not been requested before by the instant requestor. The control block 130 then writes the semaphore address in the storage compare device 120 using a control line 137. In addition, control block 130 enables the control line 135, which in turn causes the memory request from the requesting device 110 to be sent out onto the memory bus 105. When the memory request has been completed, the data is returned to the requesting device by appropriately controlling the multiplexer 150 via control line 140.

Because of the large number of memory access requests, as well as the plurality of different memory locations that can be accessed at any given time, the storage compare device 120 can be filled with a large number of semaphore addresses. Eventually, the storage compare device 120 may become filled up. When there are no empty entries available in the storage compare device 120, prior entries can be replaced by one of the many replacement algorithms currently available, such as a Least Recently Used (LRU) algorithm. The new entry is then written over a previous entry. Thus, the bypass mechanism 100 avoids having to spine lock because of the current semaphore request.

Next, the method and system of the present invention for clearing an entry in the storage compare device 120 is described. Storage compare device 120 must be cleared if the semaphore is released. The storage compare device 120 is cleared if a write to any part of the smallest detectable memory block which encloses the semaphore is performed by any processor on the memory bus 105. In this way, the storage compare device 120 will never hold the address of a semaphore which has been cleared. In addition, the semaphore entry in the storage compare device 120 is cleared when any processor writes to the semaphore.

Figure 3:
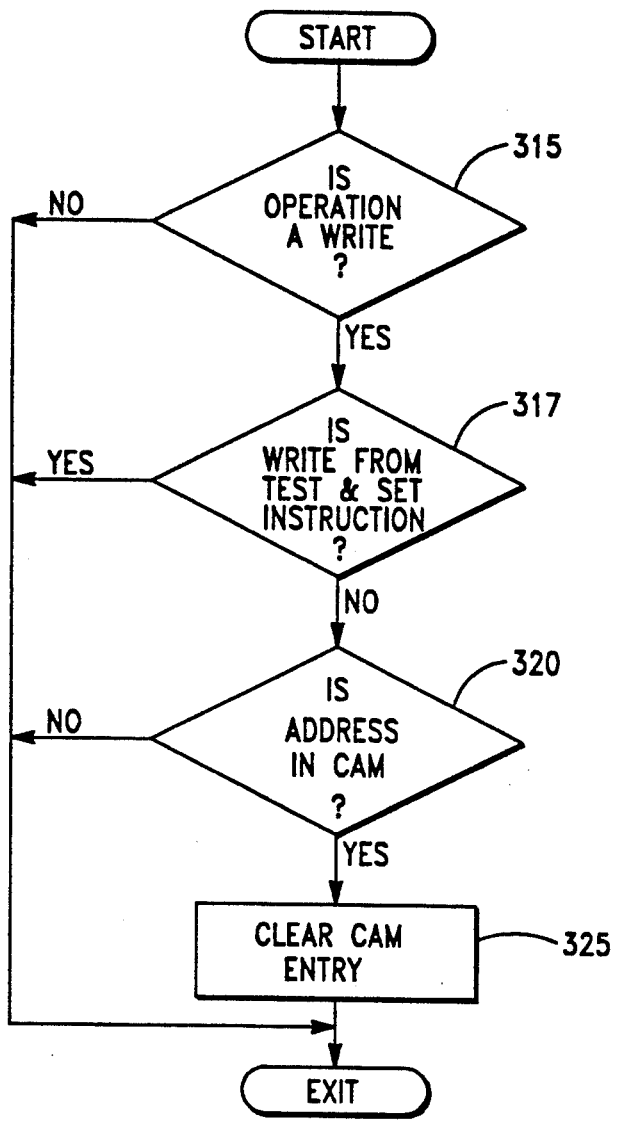
FIG. 3 shows a flowchart of a method of the present invention of clearing an address from the storage compare device of the present invention.

Referring to FIG. 3 in addition to FIG. 1, the present invention monitors (snoops) the memory bus 105 and determines if any memory transactions are occurring. If a memory request is sent on the memory bus 105 by any device, such as a CPU, the snoop mechanism will use the address signal detected to generate a corresponding snoop (request) address in the address generator 160.

As shown in a block 315, it is determined whether the memory request is a write request. If it is a write request, then the request is checked to determine whether it is a write from a test-and-set instruction, as shown in block 317. If it is a write from a test-and-set instruction, the entry in storage compare device 120 is not cleared. Otherwise, the generated snoop memory address is compared with the entries in the storage compare device 120, as shown in a block 320. If there is a HIT, that respective entry is cleared as shown in a block 325, since a write to the semaphore location means that the semaphore is released.

The snoop address generator 160 typically generates a cache sub-block address (high order bits) from the 11 bits of the memory row and column addresses appearing on the memory address bus 105. The snoop address generator 160 has control signals RAS, CAS, and WE, where RAS is the row address selector, CAS is the column address selector, and WE is the write enable. More address resolution is available from other control signals and timing information.

The present invention does not snoop the memory bus 105 for semaphore requests (other then writes) from other requesting devices. In other words, separate processes do not share information. Rather, each individual requesting device 110 is only concerned with the contents of its own storage compare device 120. Consequently, when a requesting device 110 requests access to a semaphore location that has previously been locked by another requesting device, only then does it proceed to store the semaphore address in its storage compare device 120. Although this might appear to be a wasted memory transaction, this process saves a large amount of memory space in the storage compare device 120. A considerably larger memory device (e.g., in the preferred embodiment a larger CAM 120) would be necessary if the address of every semaphore that every requesting device in the system locked was stored in local memory. Consequently, the present invention need only make one memory transaction prior to engagement of the semaphore bypass mechanism 100 of the present invention in order to save a substantial amount of memory space.

As discussed briefly above in connection with block 317 of FIG. 3, when you do a test and set operation to a semaphore in memory, essentially a read-modify-write operation is taking place. Thus, care must be taken so as to not clear the corresponding entry in any of the storage compare devices 120 during the write portion of the read-modify-write. The only time the storage compare device 120 is cleared is when there is a "real" write (i.e., a store). Thus, to avoid clearing the entry in the storage compare device, snooping is disabled in the preferred embodiment of the present invention.

Referring to FIG. 1, in a preferred embodiment of the present invention a share signal 190 indicates whether the system 100 is currently working on shared memory or not. The share signal 190 enables the snooping operation (i.e., cache coherency). When the share signal 190 is turned off the compare function described above is disabled at all of the processors. In other words, share signal 190 tells the snoop address generator 160 not to snoop during the write portion of the test and set instruction.

The present invention is not restricted to being used only in the traditional test and set mechanism. It could also be used in counting semaphores. Typically, a counting semaphore is implemented by providing a mechanism for storing particular values in the semaphore. Saving a different value in the semaphore has the effect of unlocking that memory location. The system and method of the present invention can be used without any additional limitations in a system and method that utilizes counting semaphores.

The memory bus 105 sends an encoded semaphore operation signal to all the snoop address generators 160 to indicate that a test-and-set instruction has executed.

The semaphore size should be the minimum distinct address that is either sent on the memory bus or can be derived from the memory bus controls. In the preferred embodiment of the present invention the semaphore size should be less than or equal to one memory word. In other words, if the smallest distinct memory address sent on the bus is on a word boundary, the size of the semaphore should preferably be on a word boundary. This ensures that entries are not unnecessarily cleared in storage compare device 120.

For example, if the requesting device first submits a test and set request with the memory address $0000_0001, and assuming that there are initially no entries in storage compare device 120, the memory address of $0000_0001 will be stored in storage compare device 120. When the requesting device 110 again submits another test and set request with memory address $0000_0002, this address when compared with the entries in the storage compare 120 will not create a HIT signal 122.

However, if the requesting device 110 now decides to release the first semaphore with memory address $0000_0001, and if the granularity of memory addresses on the memory bus 105 is a word size, the address seen on the memory bus is $0000_00xx (where xx are don't cares). When a comparison of this memory address is compared with the entries in storage compare 120, both memory address $0000_0001 and $0000_0002 will cause a HIT signal 122 and be cleared. This irregularity could be avoided if the semaphores have a size of a word or if only a single semaphore is held within a word.

In spite of this irregularity, there is no effect in terms of functionality. What this entails is that since $0000_0002 has been unnecessarily cleared, the next time when a process requests semaphore $0000_0002, an unnecessary memory request for the semaphore will be generated.

While the invention has been particularly shown and described with reference to preferred embodiments thereof, it will be understood by those skilled in the art that various changes in form and details may be made therein without departing from the spirit and scope of the invention.

We claim:

1. A computer-based system which improves the performance of controlling access to shared resources, the computer-based system comprising:
   (a) a bus connected to one or more shared resources;
   (b) a storage compare unit, coupled to a requesting device adapted to access said one or more shared resources, adapted to store addresses of one or more semaphores associated with said shared resources that are locked; and
   (c) a control unit connected to determine whether said one or more shared resources are locked by evaluating the contents of said storage compare unit, and connected to control the flow of information onto said bus from said requesting device;
   wherein said storage compare unit and said control unit are located between said bus and said requesting device.

2. The system of claim 1, wherein the system is located within a central processing unit.

3. The system of claim 1, wherein said storage compare unit comprises a content addressable memory (CAM).

4. The system of claim 1, wherein said one or more semaphores are counting semaphores.

5. The system of claim 1, further comprising a snoop address generator, said snoop address generator connected to snoop said bus for writes to memory locations.

6. The system of claim 5, further comprises a share signal, said share signal connected to said snoop generator to prevent the requesting devices from clearing an entry in said storage compare unit during a test and set memory transaction.

7. The system of claim 1, wherein a valid bit is associated with each storage location in said storage compare unit.

8. The system of claim 1, wherein said control unit is adapted to allow information to flow onto said bus if said shared resource has not been locked, and to stop the flow of information onto said bus if said shared resource has been locked.

9. A method which improves the performance of controlling access to shared resources, comprising the steps of:
   (1) comparing, in response to a request for access to a shared resource which is protected by a semaphore, the address of a requested semaphore with the contents of a storage compare unit, said storage compare unit being interconnected between a requesting device and a bus;
   (2) storing the address of said semaphore associated with said shared resource in said storage compare unit if it is has not already been stored in said storage compare unit as determined by step (1); and
   (3) sending a semaphore failed signal to the source of said request for said semaphore if said semaphore address is resident in said storage compare unit.

10. The method of claim 8, further comprising a step of generating a snoop address corresponding to addresses on a bus, wherein said snoop address is used to clear an address in said storage compare unit.

11. The method of claim 9, further comprising a step of releasing said semaphore and clearing said storage compare unit in response to a write to said semaphore.

12. A computer-based method which improves the performance of controlling access to shared resources, comprising the steps of:
   (1) testing a storage compare unit for an address of a semaphore which is associated with a memory location, said storage compare unit directly coupled between a requesting device and a bus;
   (2) sending a failed signal if said semaphore address is in said storage compare unit;
   (3) reading the contents of said semaphore if said semaphore address is not in said storage compare unit, and
      (a) if said semaphore is locked, then return a locked signal to said requesting device and store said semaphore address in said storage compare unit; or
      (b) if said semaphore is not locked, then return the contents of said semaphore to said requesting device, store said semaphore address in said storage compare unit, and lock said semaphore.

13. The method of claim 12, wherein step (3)(a) further comprises a step of periodically checking said storage compare unit to determine whether said semaphore has been unlocked.

14. The method of claim 12, further comprises using a share signal to prevent the requesting units from clearing said storage compare entry during a test and set memory transaction.

15. The method of claim 12, wherein each individual requesting device autonomously prevents clearing said storage compare device during a test and set operation.

16. The computer-based method of claim 12, wherein step (3)(b) further comprises the step of accessing the memory location protected by said semaphore.

17. The computer-based method of claim 12, further comprising the step of periodically repeating steps (1) through (3) as required.

18. The computer-based method of claim 12, further comprising the step of snooping said bus for memory requests in order to determine whether the address from one of said semaphores stored in said storage compare unit should be removed from said storage compare unit.

19. A method for accessing a shared resource, comprising the steps of:
   (1) issuing, from a requesting device, a test-and-set instruction which attempts to access the shared resource protected by a semaphore;
   (2) checking a local storage compare unit for an address of said semaphore, and returning a failed signal to said requesting device if said address is present, wherein said storage compare unit is directly coupled to said requesting device; and
   (3) if said address was not already present, then
      (i) enter said address of said semaphore into said local storage compare unit;
      (ii) fetch said semaphore from the shared resource and returning it to said requesting device; and
      (iii) lock said semaphore.

20. The method of claim 19, wherein said local storage compare unit is cleared if a write to the resource, other then a write from a test and set instruction, is attempted.

21. A computer-based system which improves the performance of controlling access to shared resources, the computer-based system comprising:
   one or more requesting devices connected to the shared resources via a bus, wherein at least one of said requesting devices is directly coupled to:
   (a) a storage compare unit adapted to store the addresses of one or more semaphores which are associated with the shared resources that are locked, and
   (b) a control unit connected to determine whether the shared resources are locked by evaluating the contents of said storage compare unit, and connected to control flow of information onto said bus from said requesting devices,
   wherein said storage compare unit and said control unit are located between said bus and said requesting device.

22. The system of claim 21, wherein said storage compare unit is a content addressable memory.

23. The system of claim 21, further comprising a snoop address generator coupled to said storage compare device, said control unit, and said bus, wherein said snoop address generator is adapted to snoop said bus for writes to the shared resources.

24. The system of claim 21, wherein the size of said semaphore is equal to a minimum distinct address that can be sent onto said bus.

25. In a system having a plurality of requesting devices which are connected to shared resources via a bus, wherein at least one of the requesting devices has an associated storage compare unit, a computer-based method which improves the performance of controlling access to the shared resources comprises the steps of:

(1) testing if an address of a semaphore associated with a requested shared resource is in the storage compare unit associated with a requesting device, wherein said storage compare unit is located between said requesting device and the bus;

(2) if said address of said semaphore is not in said storage compare unit, then the system performs the steps of: (a) entering said address of said semaphore into said storage compare unit, (b) fetching said semaphore from memory and returning said semaphore to said requesting device, and (c) setting said semaphore to a locked value; and (3) if said address of said semaphore is in said storage compare unit then return a failure signal to said requesting device without accessing the bus.

26. The method of claim 25, further comprising the step of periodically repeating all steps in order to access said semaphore.

27. The method of claim 25, further comprising the step of removing one of said addresses associated with said semaphores from said storage compare unit when said storage compare unit is full using a least-recently-used algorithm.

28. The method of claim 25, further comprising the step of removing said address of said semaphore from said storage compare unit by writing to said semaphore.

29. The method of claim 25, further comprising the steps of releasing said semaphore and clearing said storage compare unit in response to a write to said shared resource holding said semaphore.

30. The method of claim 25, further comprising the steps of:

snooping said bus for a write request from one of the requesting devices and generating a snoop address from said write request; and determining whether said write request is from a "test and set" instruction, and if not, then comparing said snoop address with the contents of said storage compare unit and deleting said entry if there is a match.

* * * * *

UNITED STATES PATENT AND TRADEMARK OFFICE
CERTIFICATE OF CORRECTION

PATENT NO. : 5,261,106
DATED : November 9, 1993
INVENTOR(S) : Derek J. Lentz et al It is certified that error appears in the above-indentified patent and that said Letters Patent is hereby corrected as shown below:

On the cover page, Item [73] Assignee: should read "Seiko Epson Corporation, Tokyo, Japan".

Column 7, line 36, claim 10, "the method of claim 8, further....." should read -- 10. The method of claim 9, further --.

Signed and Sealed this

Twenty-fifth Day of April, 1995

Attest:

BRUCE LEHMAN

*Attesting Officer*  *Commissioner of Patents and Trademarks*